June 28, 1955  P. NARBUTOVSKIH  2,711,882
ELECTRICAL APPARATUS
Filed Jan. 12, 1952

WITNESSES:
E. A. McCloskey.
K. H. Thomas

INVENTOR
Paul Narbutovskih.
BY
Ezra W. Savage
ATTORNEY

United States Patent Office 2,711,882
Patented June 28, 1955

2,711,882

ELECTRICAL APPARATUS

Paul Narbutovskih, Sharpsville, Pa., assignor to Westinghouse Electric Corporation, East Pittsburgh, Pa., a corporation of Pennsylvania Application January 12, 1952, Serial No. 266,170

4 Claims. (Cl. 257—191)

This invention relates to electrical apparatus and particularly to apparatus utilizing vaporization of a liquid dielectric to dissipate the heat developed during the operation of the apparatus, and utilizing the vapors of the cooling liquid as an electrical insulating fluid.

It is well known in the electrical industry to insulate enclosed electrical apparatus with a liquid dielectric by immersing the electrical elements therein for the purpose of cooling and electrically insulating the elements from one another and from the casing in which they are disposed. However, disadvantages have been found to occur in the manufacture and use of liquid dielectric apparatus of this type. For instance, one disadvantage is the necessity for utilizing large quantities of liquid dielectric such as oils, chlorinated compounds, or the like.

The recently developed dry type gas-filled or air-cooled transformer avoids some of the disadvantages of the liquid dielectric filled equipment but it likewise has a number of disadvantages. One disadvantage is the necessity for providing adequate means for securing sufficient cooling of the electric apparatus.

An object of this invention is to provide, in enclosed electrical apparatus which relies upon vaporization of a liquid coolant to dissipate heat developed in use, for retarding the dissipation of heat from the vaporized coolant until a predetermined pressure is developed within the enclosure and then provide for a progressive increase in the dissipation of heat through the vaporized coolant to thereby maintain the pressure and temperature within the enclosure within a predetermined range of values.

Another object of this invention is to provide, in electrical apparatus enclosed in a case which relies upon vaporization of a liquid coolant to dissipate heat developed in use, for controlling the rate of the dissipation of heat from the vaporized coolant by preventing the vaporized coolant from entering an external cooling means until a predetermined pressure is developed within the case and to thereafter permit a progressive increase of flow of vaporized coolant from the case into the cooling means as the pressure tends to increase to thereby automatically maintain the pressure and temperature within the case within a predetermined range of values.

Figure 1:
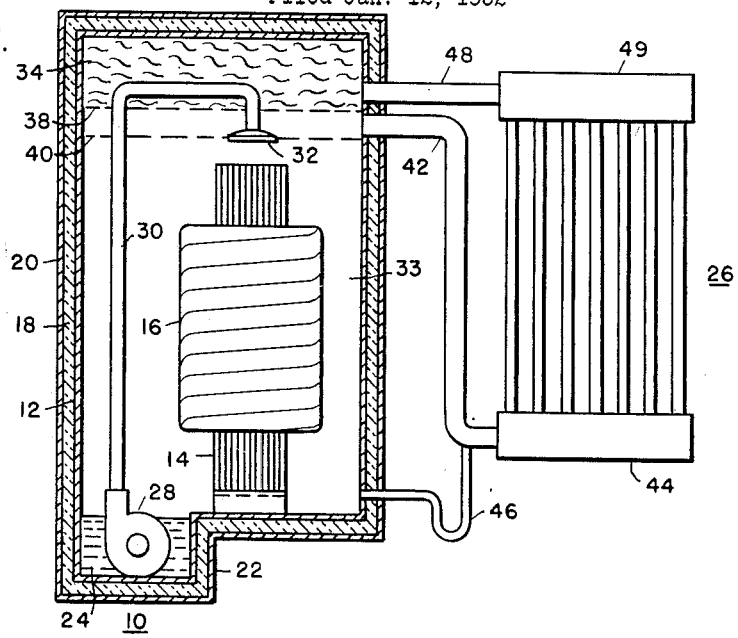
Figure 2:
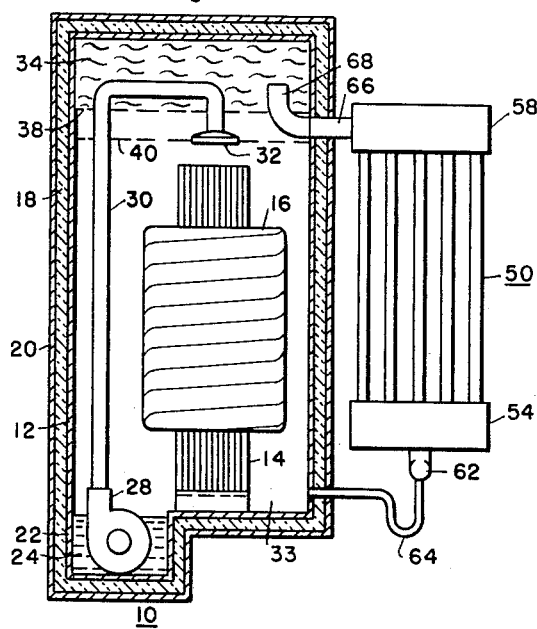
Figure 3:
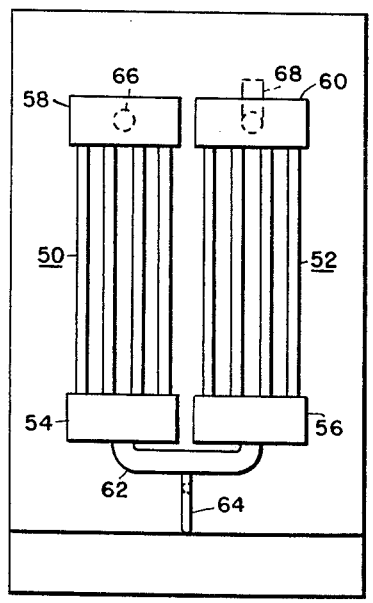

Other objects of this invention will become apparent from the following description when taken in conjunction with the accompanying drawing, in which:

Figure 1 is a diagrammatic view of a transformer comprising one embodiment of the teachings of this invention, Figure 2 is a diagrammatic view illustrating another embodiment of the teachings of this invention, Figure 3 is a side view of the second embodiment of the teachings of this invention.

Referring to Figure 1, this invention is illustrated by reference to a transformer 10 which comprises a sealed case 12 having disposed therein a magnetic core member 14 and associated electrical windings 16. As illustrated, the electrical windings 16 and the core member 14 are disposed in seated relation with the lower portion of the case 12. For the purpose of simplifying the drawing, the leads to the windings 16 and the bushings normally carried by the top or cover of the case 12 are not shown. However, in order to more effectively maintain a near constant pressure and temperature within the case 12 for a greater range of load on the transformer 10, a heat insulating material 18, such as glass fiber or the like, may be disposed around the case 12, being maintained in position by an outer jacket 20 of metal.

As illustrated, a sump 22 is situated in the lower portion of the case 12 and has disposed therein a supply of a vaporizable liquid coolant 24. The supply of liquid coolant 24 is relatively small as compared to the size of the case 12 being normally in the sump 22 out of contact with the core member 14 and the electrical windings 16. However, the amount of the liquid coolant 24 should be sufficient to fill the case 12 and an associated condensing unit 26 with vapor, when the vapor of the coolant is at its maximum temperature expected during the operation of the apparatus. In practice, however, it will be necessary to provide additional liquid coolant to permit the normal functioning of the pump 28.

Different vaporizable liquid coolants are known to those skilled in the art and can be employed in practicing this invention. In practice, it is preferred to utilize the vaporizable liquid coolants disclosed in the Hill Patent 2,561,738, and which is assigned to the assignee of this invention.

As disclosed in the Hill patent, the vaporizable liquid coolant may comprise the liquid fluorinated organic compounds selected from the group consisting of hydrocarbons, hydrocarbon ethers and tertiary hydrocarbon amines in which at least half the hydrogen atoms have been substituted by at least one halogen selected from the group consisting of chlorine and fluorine, and of which at least half of the halogen is fluorine. The hydrocarbons and the hydrocarbon groups attached to oxygen or nitrogen atoms may be aliphatic, aromatic, cycloaliphatic and alkaryl. Liquid perfluorocarbons, perfluorocarbon ethers and perfluorocarbon tertiary amines boiling between 50° C. and 225° C. have outstanding properties. Perhalocarbon compounds composed of only carbon and a halogen selected from at least one of the group consisting of chlorine and fluorine, of which fluorine comprises at least half the halogen atoms are excellent liquid coolants for the purpose of this invention.

The vapors of the fluorinated organic compound referred to hereinbefore have outstanding electrical insulating properties. They are superior to practically all other gases in such electrical insulating characteristics as breakdown strength, dielectric strength, power factor and resistance to formation of corona under similar conditions of temperature and pressure. These compounds are outstanding in their stability to chemical and thermal breakdown being surpassed only by the permanent gases. The fluorinated compounds in the liquid state exert negligible, if any, solvent or deteriorating action on ordinary insulating materials and varnishes employed in the preparation of conventional electrical elements such as windings, cores and coils.

As examples of specific fluorinated organic compounds which may be utilized in practicing this invention either alone or in mixtures, reference may be had to the following list of fluorinated organic compounds:

|  | Boiling point, °C. |
|---|---|
| Perfluorophenanthrane | 205 |
| Perfluorodibutyl ether | 100 |
| Perfluorotriethyl amine | 71 |
| Perfluorotributyl amine | 178 |
| Perfluorodimethylcyclohexane | 101 |
| Perfluoromethylcyclohexane | 76 |
| Perfluoro-n-heptane | 82 |
| Perfluorotoluene | 102 |
| Monochlorotetrafluoro-(trifluoromethyl)benzene | 137 |
| Dichlorotrifluoro-(trifluoromethyl)benzene | 170 |
| Trichlorodifluoro-(trifluoromethyl)benzene | 207 |
| Monochloropentadecafluoroheptane | 96 |
| 2-chloro-1,4-bis(trifluoromethyl)benzene | 148 |
| 2-chlorotrifluoromethylbenzene | 150 |
| Perfluorodiethylcyclohexane | 148 |
| Perfluoroethylcyclohexane | 101 |
| Perfluoropropylcyclohexane | 123 |
| Chlorononafluorobis(trifluoromethyl)cyclohexane | 129 |
| Perfluoronaphthalane | 140 |
| Perfluoro-1-methylnaphthalane | 161 |
| Perfluorodimethylnaphthalanes | 177 to 179 |
| Perfluoroindane | 116 to 117 |
| Perfluorodfluorane | 190 |
| Perfluorobicyclo-(2.2.1)heptane | 70 (746 mm.) |

The amines, and ethers may have dissimilar halogen substituted hydrocarbon groups present as, for example, 2,2-dichloro-1,1,1,-trifluoroethyl-perfluorobutylether and perfluorodibutylethylamine. The freezing points of the above listed liquid compounds are below zero degrees centigrade, many being below −50° C., so that they can be safely employed, individually or in mixtures, under nearly all ambient conditions to be expected in service.

In order to apply the liquid coolant 24 to the electrical windings 16, the pump 28 is disposed for operation to pump the liquid coolant 24 through a conduit 30 to a spray or flow device 32 from which the liquid coolant 24 is distributed over the core member 14 and the windings 16. The liquid coolant when thus delivered, distributes itself as a thin film or stream (not shown) over the core member 14 and windings 16 and is freely evaporated provided the electrical components are at an elevated temperature, thereby cooling the core member 14 and windings 16, and forming a vaporized liquid coolant in the space indicated generally by 33 within the case 12. Other methods of applying the liquid coolant 24 to the core member 14 and windings 16 may be used, consistent with the physical arrangement of the apparatus, the only essential requirement being a reasonably uniform distribution of the liquid film over the parts to be cooled.

In order to provide a gas cushion for the vaporized liquid coolant within the case 12, a non-condensable gas 34, such as nitrogen, argon, neon, carbon dioxide, or the like, or mixtures thereof, is disposed in the upper portion of the casing 12. Due to the fact that the density of the coolant vapors is many times that of the noncondensable gas 34, there will be a natural tendency for this noncondensable gas 34 to separate out and to collect in the upper portion of the case 12. Practice indicates that such a separation of the noncondensable gas 34 and the vapor is usually such as to form a sharp boundary line 38 between the two. As illustrated in the drawing, the gas vapor boundary line 38 is shown directly beneath the gas 34, the gas vapor boundary line 38 representing the uppermost position of the vaporized coolant in space 33 when the transformer 10 is, as represented in Fig. 1, under a relatively high load. On the other hand, a gas vapor boundary line 40 represents the uppermost position of the vaporized coolant in space 33 when the transformer 10 is under a relatively low load. Since the pressure and temperature of the vaporized coolant within the case 12 increases with the load on the transformer 10 due to the compressibility of the gas cushion 34, the gas vapor boundary line moves into position 38 when the transformer is at its highest operating temperature and pressure, whereas the gas vapor boundary line 40 represents the uppermost position of the vaporized coolant in space 33 when the transformer 10 is at a relatively low operating temperature and pressure. In this embodiment, it is to be noted that the spraying device 32 is preferably positioned to discharge below the gas vapor boundary line 40, so that the sprayed liquid coolant will not create turbulence in the supply of noncondensable gas 34, and the gas vapor boundary line will therefore remain more or less steady for a given operating condition of the transformer 10.

In order to effectively pass the vaporized coolant within the case 12 to the condensing unit 26 once it rises above the gas vapor boundary line 40 and thus maintain the pressure and temperature range within the case 12 within a predetermined range of values, one end of a conduit 42 is disposed adjacent the top of the case 12 and in the vicinity of the gas vapor boundary lines 38 and 40. As can be seen from the drawing, the other end of the conduit 42 is mechanically connected to a lower header 44 which comprises a part of the condensing unit 26. For the purpose of returning the vaporized coolant to the sump 22 once it has been condensed in the condensing units 26, one end of a conduit 46 is also connected to the lower header 44, the other end of the conduit 46 being disposed adjacent the lower portion of the case 12. As illustrated, the conduit 46 comprises a U-shaped portion which serves as a liquid trap so as to prevent the flow of the vaporized coolant from within the case 12 through the conduit 46 to the header 44 of the condensing unit 26.

In order to remove any of the non-condensable gas 34 that might escape into the condensing unit 26 through the conduit 42, one end of a conduit 48 is disposed adjacent the top of the case 12 so as to be in contact with the non-condensable gas 34, the other end of the conduit 48 being connected to an upper header 49 which likewise comprises a part of the condensing unit 26.

In operation, as the electrical windings 16 become heated due to a load on the transformer 10, and a portion of the liquid coolant 24 is sprayed thereover, the liquid coolant becomes vaporized and eventually rises and compresses the non-condensable gas 34 to a position as represented by the gas vapor boundary line 40. When the transformer 10 is operating under this relatively low load condition, the surfaces of the walls of the case 12 are of sufficient area to effectively cool the vaporized liquid coolant in space 33 and dissipate sufficient heat therefrom to maintain the given temperature and pressure within the case 12. As the load on the transformer 10 increases with an accompanying increase in temperature of the windings 16 the pressure of the vaporized coolant in space 33 increases, whereby the vaporized coolant in space 33 rises to the level of the opening of the conduit 42. When such a condition exists, a portion of the vaporized coolant in space 33 flows by natural convection down through the conduit 42 into the header 44 of the condensing unit 26. The vaporized coolant then flows through the condensing unit 26 in the direction of the upper header 49, during which movement the vaporized coolant is condensed and returned to the sump 22 through the conduit 46. If any of the non-condensable gas 34 has escaped into the condensing unit 26, it will flow out through the upper header 49 and conduit 48 to the space within the case 12 occupied by the non-condensable gas 34.

Assuming the load on the transformer 10 continues to increase, the vaporized coolant in space 33 will continue to rise and compress the non-condensable gas 34 until it reaches the position as represented by the gas vapor boundary line 38. During this upward movement of the vaporized coolant, its flow down through the conduit 42 into the condensing unit 26 becomes progressively greater to thereby automatically maintain the pressure and temperature within the case 12 within a predetermined range of values.

Referring to Fig. 2 of the drawing, there is illustrated another embodiment of the invention. In this embodiment, the same reference characters are employed for identifying like components of the apparatus of Fig. 1.

In order to more effectively cool the vaporized coolant in space 33 once it flows from within the case 12, the embodiment shown in Fig. 2 is provided with condensing units 50 and 52. As illustrated, the condensing units 50 and 52 comprise lower headers 54 and 56, respectively, and upper headers 58 and 60, respectively. In this instance, the lower headers 54 and 56 are connected together by means of a U-shaped conduit 62. In order to permit the passage of the condensed vaporized coolant from the condensing units 50 and 52 to the sump 22, one end of a conduit 64 is connected to the conduit 62, the other end being disposed adjacent the lower portion of the casing 12. The conduit 64 is U-shaped so as to provide a liquid trap therein and thus prevent the vaporized coolant in space 33 from entering the condensing units 50 and 52 through the conduit 64.

In order to permit the flow of the vaporized coolant from the space defined by the case 12 to the condensing units 50 and 52, one end of a conduit 66 is disposed adjacent the top of the case 12 in the vicinity of the gas vapor boundary lines 38 and 40, the other end of the conduit 66 being connected to the upper header 58 of the condensing unit 50. In addition, for the purpose of permitting the escape of any of the non-condensable gas 34 that might have flowed into the condensing units 50 and 52 through the conduit 66, one end of conduit 68 is disposed in the space occupied by the non-condensable gas 34, the other end of the conduit 68 being connected to the upper header 60 of the condensing unit 52. As can be seen from the drawing, the L-shaped conduit 68 in this embodiment of the invention comprises a turned-up portion disposed within the case 12 which is provided in order to facilitate the transfer by convection of the vaporized coolant, and any of the non-condensable gas 34 that might be mixed therewith through the condensing unit 50 and up through the condensing unit 52.

In operation, as the load on the transformer 10 increases so that the vaporized coolant in space 33 rises to the level of the opening of the conduit 66, the vaporized coolant flows into the upper header 58 of the condensing unit 50 and down through the condensing unit 50 to the lower header 54. The vaporized coolant then flows through the conduit 62 up through the condensing unit 52, being condensed as it passes through the condensing units 50 and 52. As the load on the transformer 10 increases further, a still greater amount of vaporized coolant flows into the condensing units 50 and 52 to thus maintain the pressure and temperature within the case 12 within predetermined values.

The apparatus embodying the teachings of this invention has several advantages. For instance, it maintains the temperature and pressure within the case 12 within a predetermined range of values for fewer components than the prior art apparatus. Such being the case, the original cost of the apparatus is lower. Also, since there are fewer components, the maintenance costs are held to a minimum.

Although the invention has been described with reference to certain specific embodiments thereof, numerous modifications falling within the spirit and scope of the invention are possible.

I claim as my invention:

1. In sealed electrical equipment, the combination comprising, a sealed case, apparatus disclosed within the sealed case which in use develops heat, means for dissipating the heat comprising, a quantity of a vaporizable liquid coolant comprising at least one liquid fluorinated organic compound selected from the group consisting of hydrocarbons, hydrocarbon ethers and tertiary hydrocarbon amines in which at least half the hydrogen atoms have been substituted by at least one halogen selected from the group consisting of fluorine and chlorine, and at least half the halogens is fluorine, the compound having a boiling point of from 50° C. to 225° C. at atmospheric pressure, and means for applying the liquid coolant to the apparatus to cool the apparatus by evaporation of the coolant to a condensable vapor, a non-condensable gas, the condensable vapor being the heavier with the result that it separates from the non-condensable gas and accumulates in a lower layer, the difference in weight between the gas and vapor being such that a distinct boundary line between the condensable vapor and the non-condensable gas is formed, the non-condensable gas above the condensable vapor forming a cushion therefor, the boundary line having a lower position for one temperature value of the condensable vapor and a higher position for a higher temperature value of the condensable vapor, and means for automatically maintaining the pressure and temperature within the sealed case within predetermined values, said means comprising, a condensing unit having an intake and an outlet header and being disposed externally of the sealed case, a conduit for the condensable vapor, one end of the conduit being connected to the sealed case and having an opening in the vicinity of the higher and lower positions for the gas-vapor boundary line, the other end of the conduit being so connected to the intake header of the condensing unit that the condensable vapor will flow therethrough once the boundary line rises to the level of the opening of the conduit, a return conduit for the condensed vapor one end of which is in fluid communication with the lower portion of the condensing unit, the other end being connected adjacent the lower portion of the sealed case, the return conduit, the condensing unit, and the sealed case being so disposed with respect to one another that the return conduit prevents the flow of the condensable vapor through the return conduit, and another conduit, one end of which is connected to the outlet header of the condensing unit, and the other end of which is connected to the upper portion of the sealed case, said another conduit being disposed to receive said non-condensable gas that may have gotten into the condensing unit and pass it from the outlet header to said non-condensable gas disposed above the gas vapor boundary line.

2. In sealed electrical equipment, the combination comprising, a sealed case, apparatus disposed within the sealed case which in use develops heat, means for dissipating the heat comprising, a quantity of a vaporizable liquid coolant comprising at least one liquid fluorinated organic compound selected from the group consisting of hydrocarbons, hydrocarbon ethers and tertiary hydrocarbon amines in which at least half the hydrogen atoms have been substituted by at least one halogen selected from the group consisting of fluorine and chlorine, and at least half the halogen is fluorine, the compound having a boiling point of from 50° C. to 225° C. at atmospheric pressure, and means for applying the liquid coolant to the apparatus to cool the apparatus by evaporation of the coolant to a condensable vapor, a non-condensable gas, the condensable vapor being the heavier with the result that it separates from the non-condensable gas and accumulates in a lower layer, the difference in weight between the gas and vapor being such that a distinct boundary line between the condensable vapor and the non-condensable gas is formed, the non-condensable gas above the condensable vapor forming a cushion therefor, the gas-vapor boundary line having a lower position for one temperature value of the condensable vapor and a higher position for a higher temperature value of the condensable vapor, and means for automatically maintaining the pressure and temperature within the sealed case within predetermined values, said means comprising, a condensing unit having an upper and a lower header and being disposed externally of the sealed casing, a conduit for the condensable vapor, one end of the conduit being connected to the sealed case and having an opening in the vicinity of the higher and lower positions for the gas-vapor boundary line, the other end of the conduit being so connected to the condensing unit that the condensable vapor will flow therethrough once the gas-vapor boundary line rises to the level of the opening of the conduit, a return conduit for the condensed vaporized coolant of smaller diameter than said first conduit, one end of the return conduit being in fluid communication with the lower header and the other end being connected adjacent the lower portion of the sealed case, the return conduit, the condensing unit, and the sealed case being so disposed with respect to one another that the return conduit prevents the flow of the condensable vapor through the return conduit, and another conduit, one end of which is connected to the upper header of the condensing unit, the other end being connected adjacent the top of the sealed case above the gas-vapor boundary line so as to pass said non-condensable gas that may have gotten into the condensing unit to said non-condensable gas disposed above the gas-vapor boundary line.

3. In sealed electrical equipment, the combination comprising, a sealed case, apparatus disposed within the sealed case which in use develops heat, means for dissipating the heat comprising, a quantity of a vaporizable liquid coolant comprising at least one liquid fluorinated organic compound selected from the group consisting of hydrocarbons, hydrocarbon ethers and tertiary hydrocarbon amines in which at least half the hydrogen atoms have been substituted by at least one halogen selected from the group consisting of fluorine and chlorine, and at least half the halogen is fluorine, the compound having a boiling point of from 50° C. to 225° C., and means for applying the liquid coolant to the apparatus to cool the apparatus by evaporation of the coolant to a condensable vapor, a non-condensable gas, the condensable vapor being the heavier with the result that it separates from the non-condensable gas and accumulates in a lower layer, the difference in weight between the gas and vapor being such that a distinct boundary line between the condensable vapor and the non-condensable gas is formed, the non-condensable gas above the condensable vapor forming a cushion therefor, the gas-vapor boundary line having a lower position for one temperature value of the condensable vapor and a higher position for a higher temperature value of the condensable vapor, and means for automatically maintaining the pressure and temperature within the sealed case within predetermined values, said means comprising, two series-connected condensing units having upper and lower headers and being disposed externally of the sealed case, a conduit for the condensable vapor, one end of the conduit being connected to the sealed case and having an opening in the vicinity of the higher and lower positions for the gas-vapor boundary line, the other end of the conduit being connected to the upper header of one of the condensing units so that the condensable vapor will flow to said upper header once the boundary line rises to the level of the opening of the conduit, a return conduit for the condensed vapor, one end of which is in fluid communication with the lower headers of the two condensing units, the other end being connected adjacent the lower portion of the sealed case, the return conduit, the two series-connected condensing units, and the sealed case being so disposed with respect to one another that the return conduit prevents the flow of the condensable vapor through the return conduit, and another conduit, one end of which is connected to the upper header of the second condensing unit, the other end of the conduit being connected to the upper part of said case, said another conduit being disposed to receive said non-condensable gas from the two condensing units that may have gotten therein through said first conduit and pass it to said non-condensable gas disposed above the gas-vapor boundary line within the sealed case.

4. In sealed electrical equipment, the combination comprising, a thermally insulated sealed case, apparatus disposed within the sealed case which in use develops heat, means for dissipating the heat comprising, a quantity of vaporizable liquid coolant, comprising at least one liquid fluorinated organic compound selected from the group consisting of hydrocarbons, hydrocarbon ethers and tertiary hydrocarbon amines in which at least half the hydrogen atoms have been substituted by at least one halogen selected from the group consisting of fluorine and chlorine, and at least half the halogen is fluorine, the compound having a boiling point of from 50° C. to 225° C. at atmospheric pressure, and means for applying the liquid coolant to the apparatus to cool the apparatus by evaporation of the coolant to a condensable vapor, a non-condensable gas, the condensable vapor being the heavier with the result that it separates from the non-condensable gas and accumulates in a lower layer, the difference in weight between the gas and vapor being such that a distinct boundary line between the condensable vapor and the non-condensable gas is formed, the non-condensable gas above the condensable vapor forming a cushion therefor, the gas-vapor boundary line having a lower position for one temperature value of the condensable vapor and a higher position for a higher temperature value of the condensable vapor, and means for automatically maintaining the pressure and temperature within the sealed case within predetermined values, said means comprising, two series-connected condensing units having upper and lower headers and being disposed externally of the sealed case, a conduit for the condensable vapor, one end of the conduit being connected to the sealed case and having an opening in the vicinity of the higher and lower positions for the gas-vapor boundary line, the other end of the conduit being connected to the upper header of one of the condensing units so that the condensable vapor will flow therethrough once the gas-vapor boundary line rises to the level of the opening of the conduit, a return conduit for the condensed vapor, one end of which is in fluid communication with the lower headers of the two condensing units, the other end being connected adjacent the lower portion of the sealed case, the return conduit, the two series-connected condensing units, and the sealed case being so disposed with respect to one another that the return conduit prevents the flow of the condensable vapor through the return conduit, and another conduit disposed to receive said non-condensable gas from the two condensing units that may have gotten therein through said conduit for the condensable vapor and pass it to the sealed case, said another conduit terminating above the gas-vapor boundary line for increasing the rate of flow of the condensable vapor and non-condensable gas when in the two condensing units.

References Cited in the file of this patent

UNITED STATES PATENTS

| | | |
|---|---|---|
| 1,833,719 | Moody | Nov. 24, 1931 |
| 2,341,058 | Palmer | Feb. 8, 1944 |
| 2,561,738 | Hill | July 24, 1951 |